United States Patent [19]
Pau et al.

[11] Patent Number: 6,108,381
[45] Date of Patent: Aug. 22, 2000

[54] TREE SEARCH VECTOR QUANTIZATION FOR COMPRESSING DIGITAL VIDEO DATA TO BE STORED IN BUFFERS AND MPEG DECODER AND SQTV PROCESSOR WITH REDUCED MEMORY REQUISITES

[75] Inventors: Danilo Pau, Sesto S. Giovanni; Roberta Bruni, Seregno; Roberto Sannino, Bergamo, all of Italy

[73] Assignee: SGS-Thomson Microelectronics S.r.l., Agrate Brianza, Italy

[21] Appl. No.: 09/017,413

[22] Filed: Feb. 2, 1998

[30] Foreign Application Priority Data

Feb. 6, 1997 [EP] European Pat. Off. .............. 97830041

[51] Int. Cl.[7] ..................................................... H14N 7/12
[52] U.S. Cl. .......................... 375/240; 348/418; 348/417; 348/414; 348/422; 382/253
[58] Field of Search ........................... 348/414, 417–418, 348/422; 382/253; 711/100, 111; 712/38; 364/134; 341/79, 200

[56] References Cited

U.S. PATENT DOCUMENTS

| | | | |
|---|---|---|---|
| 4,811,112 | 3/1989 | Rutledge ................................. | 358/430 |
| 5,398,069 | 3/1995 | Huang et al. ........................... | 348/422 |
| 5,468,069 | 11/1995 | Prasanna et al. ...................... | 382/253 |
| 5,477,221 | 12/1995 | Chang et al. ............................ | 341/51 |
| 5,504,916 | 4/1996 | Murakami et al. ..................... | 711/100 |
| 5,799,110 | 8/1998 | Israelsen et al. ....................... | 382/253 |
| 5,844,612 | 12/1998 | Israelsen ................................. | 348/414 |
| 5,889,891 | 3/1999 | Gersho et al. .......................... | 382/253 |
| 5,909,513 | 6/1999 | Liang et al. ............................. | 382/253 |

FOREIGN PATENT DOCUMENTS

| | | | |
|---|---|---|---|
| 0 535 272 A1 | 4/1993 | European Pat. Off. ......... | H04N 7/13 |
| 0 624 032 A2 | 11/1994 | European Pat. Off. ......... | H04N 7/13 |
| 0 687 111 A2 | 12/1995 | European Pat. Off. ......... | H04N 7/24 |
| 0 732 857 A1 | 3/1996 | European Pat. Off. ......... | H04N 7/50 |

OTHER PUBLICATIONS

Cassimatis, *ICC* Jun. 1986, Toronto, Canada, "Intra–Frame Picture Coding using Vector Quantization", pp. 41.8.1–41.8.5.

*Digest of Technical Papers of the Int'l Conference on Consumer Electronics (ICCE)*, Rosemont, IL Jun. 1994, "An Integrated MPEG–1 and MPEG–2 Decoder", pp. 324–325.

Modestino et al., *IEEE Transactions on Signal Processing*, vol. 40, No. 3, Mar. 1992, "Adaptive Entropy–Code Predictive Vector Quantization of Images", pp. 633–644.

D'Alto et al., *Proceedings of the Custom Integrated Circuits Conference*, Conf. No. 16, May 1994, IEEE, "Multipurpose Scanning Rate Converter IC for Improved Quality Television", pp. 111–114.

Miyaguchi et al., *Proceedings of the Int'l Conference on Consumer Electronics (ICCE)*, Rosemont, IL Jun. 1990, "Digital TV With Serial Video Processor", pp. 324–325.

*Primary Examiner*—Vu Le
*Attorney, Agent, or Firm*—Theodore E. Galanthay; Allen, Dyer, Doppelt, Milbrath & Gilchrist, P.A.

[57] ABSTRACT

A method for reducing the RAM requirement for temporarily storing a stream of data blocks in a coding/decoding system of information transferable by blocks, includes the steps of: compressing and coding the data by blocks through a tree search vector quantization (TSVQ); storing TSVQ compressed and coded data in the RAM; and decoding and decompressing in a subsequent reading of the data stored in the RAM the coded and compressed data, thereby reconstituting the stream of digital data blocks. The method may include fixing a certain scanning path of each data block of the stream to be decomposed into vectors of preestablished dimensions; coding the first vector of the scanning of a certain block of data in an unmodified manner; generating a replica vector of the last coded vector and calculating a prediction error vector; quantizing according to a binary search in a table of read-only quantized vectors the prediction error, by coding its address in the table; and repeating several of the steps for all the vectors of the scanning of each input data block.

4 Claims, 8 Drawing Sheets

TREE SEARCH VECTOR QUANTIZATION FOR COMPRESSING DIGITAL VIDEO DATA TO BE STORED IN BUFFERS AND MPEG DECODER AND SQTV PROCESSOR WITH REDUCED MEMORY REQUISITES

FIELD OF THE INVENTION

The present invention relates to an integrated video decoder, and, more particularly, to an integrated video decoder based on the use of the MPEG compression algorithm having a reduced requirement of video memory.

BACKGROUND OF THE INTENTION

The MPEG-1 standard was developed in response to the industry need of implementing an efficient way of storing and retrieving a video information on storage media of the digital type, as for example CD-ROMs. Of course, the MPEG-1 standard is also a powerful tool for efficiently storing data on similar supports such as DATs, Winchester disks, optical disks and ISDN and LAN networks. A more efficient version of the standard, called MPEG-2 has been developed in support of bitrate requirements in the field of digital video transmission applications. The standard has been generally accepted for digital TV systems, for compressing TV-resolution pictures, entirely interlaced, up to a bitrate of about 15 Mbps. A special version of the MPEG-2 standard is expected to be used in future generation HDVT systems.

The MPEG standard incorporates and utilizes important algorithms and criteria defined by previous international standards, such as, for example, the CCITT motion vectors determination algorithm H.261 and the ISO 10918 standard of the ISO JPEG Committee for the coding of still pictures. A definition of the MPEG standard (1 and 2), as well as an exhaustive description of the different techniques of implementation and the relative coding and decoding systems of the data pertaining to compressed video pictures according to the MPEG standards are described in a wealth of articles and publications on the subject, among which the following can be mentioned:

Draft International ISO/IEC DIS 13818-2 "Information technology—Generic coding of moving pictures and associated audio information";

"MPEG coding and transport system" by Leonardo Chiariglione, Digital Television Broadcasting— Proceedings;

"The MPEG video compression algorithm" by Didier J. Le Gall, Signal Processing Image Communication, Elsevier Science Publishers B.V., Vol. 4, No. 2, April 1992;

Digest No. 1995/012, Electronics Division, Institution of Electrical Engineers—London, Colloquium on: "MPEG-2—what it is and what it isn't";

"An Overview of the MPEG Compression Algorithm" Technical Note released by SGS-THOMSON MICROELECTRONICS (An 529/0294);

Datasheet "STi3500A" Datasheet of SGS-THOMSON MICROELECTRONICS; and

"STi3520A—Advanced Information for an MPEG Audio/MPEG-2 Video Integrated Decoder" (June 1995).

Figure 1:
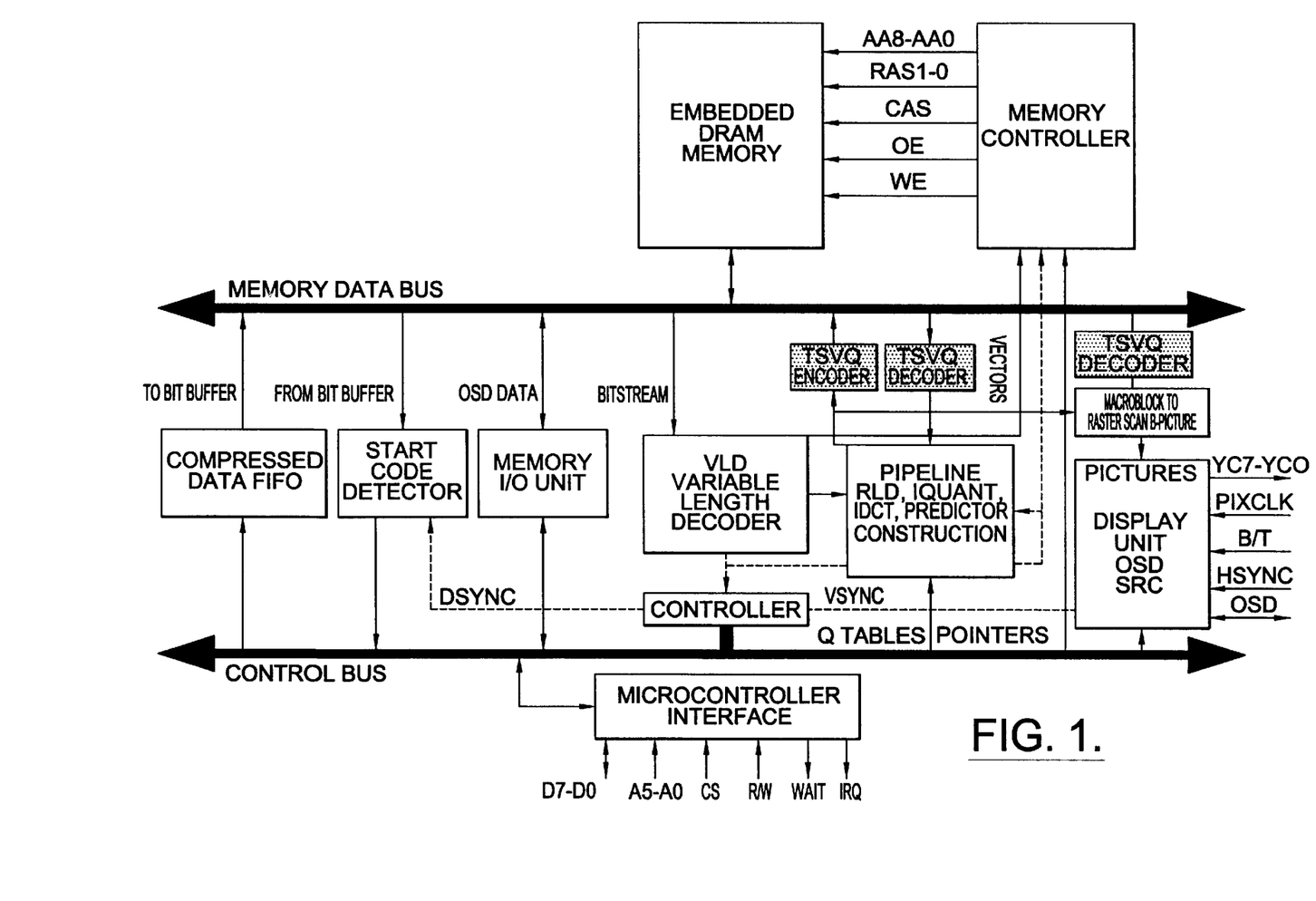
FIG. 1 is a block diagram of an MPEG2 video decoder which includes the encoder and the decoder TSVQ according to the present invention.

According to a typical architecture of an MPEG-2 decoder, such as that shown in FIG. 3 of the publication No. STi3520A relative to an MPEG Audio/MPEG-2 Video integrated decoder marketed by SGS-THOMSON MICROELECTRONICS, herein reproduced as a portion of FIG. 1, there exist well defined requirements of video memory. The video memory requirement is the capacity of an external DRAM memory that, for a PAL and NTSC application, is capable of supporting 16 Mbits PAL video signals, and can be estimated as follows.

Considering that both the MPEG-2 video decoder and the MPEG audio decoder access a unique external DRAM memory of 16 Mbits, through a common interface, the audio decoder may require access to only 65.536 bits leaving the remaining 16.711.680 bits available for satisfying the requirements of the MPEG-2 video decoder The video memory can be configured as follows.

A "Bit buffer": that is, a buffer for compressed data that the MPEG-2 standard fixes at 1.75 Mbits plus an extra amount, for example, of 810.000 bits for PAL and 685.000 bits for NTSC, in consideration of a non-ideal process of decompression actually being implemented.

A first "I-frame buffer" for the decompressed Intra-picture or briefly I-picture, in a 4:2:0 format.

A second "P-frame buffer" for the decompressed Predicted-picture or briefly P-picture, in a 4:2:0 format.

A third "B-frame buffer" for the decompressed Bidirectionally Predicted Picture or briefly B-picture, in a 4:2:0 format, eventually optimized so to require a reduced amount of memory, that is, of 0.7407 or 0.6111 of a frame, respectively, in the case of a PAL or NTSC system.

According to the present MPEG-2 standard technique, and regardless of being dealing with an I, P or B-picture, depending on the type of video standard, each "frame buffer" in the 4:2:0 format may occupy an amount of memory given by the following table.

| | | | |
|---|---|---|---|
| PAL | 720 x 576 x 8 for the luma (luminance) (Y) | 3.317.760 bits | = 4.976.640 bits |
| | 360 x 288 x 8 for the U chroma (chrominance U) | 829.440 bits | |
| | 360 x 288 x 8 for the V chroma (chrominance V) | 829.440 bits | |
| NTSC | 720 x 480 x 8 for the luma (luminance) (Y) | 2.764.800 bits | = 4.147.200 bits |
| | 360 x 240 x 8 for the U chroma (chrominance U) | 691.200 bits | |
| | 360 x 240 x 8 for the V chroma (chrominance V) | 691.200 bits | |

Therefore, in the case of a PAL system, which representing the most burdensome case, may serve as a reference example, the actual total amount of memory required will be given by:

1.835.008+810.000+4.976.640+4.976.640+(4.976.640*0.7407)= 16.284.486 bits.

This calculation takes into account a 0.7407 optimization of the B-picture frame buffer.

A further optimization, made possible by using fast synchronous memories such as SDRAM, may include carrying out the decompression of the B-picture without resorting to a storage step in the external RAM by carrying out an equivalent function internally in the integrated decoder device by a dedicated circuit block functionally placed upstream of the Display Unit.

Considering this further optimization, the video memory requirement drops to:

1.835.008+810.000+4.976.640+4.976.640=12.598.288 bits where the B-buffer is realized within the same chip containing the "core" of the decoder being required to convert the scanning of each 8*8 block, defined in the MPEG-2 compressed data stream, in that of each row of the picture (field or frame) required by the video display process of the picture itself. Such conversion macrocell is commonly referred to as "MACROBLOCK TO RASTER SCAN CONVERTER."

SUMMARY OF THE INVENTION

In view of the above-indicated present limits of optimization of the static memory requirements of an MPEG-2 decoder, a method and a relative system of implementation has now been found and represents the object of the present invention allowing for a remarkable reduction of the memory requirement This invention is equally useful in the case of systems not based on the standard MPEG, but where there is a need to store in a dedicated memory, even temporarily, full quadrants or semiquadrants of a picture.

Because of the particular importance and widespread use of the MPEG standard, the ensuing description will continue to refer to such an important application by referring to MPEG coder/decoder systems. This reference is without necessarily intending to limit the invention to this field of application that may also be utilized in other applications requiring a reduction of the memory requirement, as in the case of the so-called SQTV (Smart Quality Television) processors. For SQTV processors it is necessary to store entire pictures, or part of them, during the decoding phase to implement adequate algorithms to correct or filter out disturbances and/or to implement high refresh rates, not linked to the AC power line frequency.

Therefore, the invention is useful for digital decoders and coders of pictures, as well as in other applications such as graphic cards, video image processors, and, more particularly, where there is a need for a temporary storage of a digitized picture of any format that can viewed on at least part of a display screen. In the case of MPEG systems, the consideration that has triggered the present invention is the recognition that the amount of memory required by the decoding process, resulting from the above stated calculations, can be remarkably reduced when recompressing the pictures used as a reference for the prediction (I-picture and B-picture for the case of the standards MPEG-1 and MPEG-2), following the MPEG decompression and before they are stored in the external video memory and their decompression when they are read from the external memory.

Fundamentally, the method of the invention includes recompressing at least the I-pictures and the P-pictures while assuming that the decompression of the B-pictures is made without recourse to a storage phase by employing a "MACROBLOCK SCAN TO RASTER SCAN" conversion buffer of the B-pictures, after the MPEG-2 decompression and before sending the pictures to the Display Unit. Such an I and P pictures recompression phase must satisfy the following requirements:

effectiveness: the amount of memory occupied by the compressed pictures added to that required for carrying our their decompression should be lower than the total memory used for decoders without recompression efficiency: (1) the recompression of the pictures must be obtained in a simple manner so that the total cost of the device does not increase markedly, compared to the saving deriving from a lower memory requirement; and (2) the quality of the reconstructed pictures should not show an appreciable degradation or in any case must remain acceptable in terms of cost/quality ratio The preceding European patent applications No. 96830085.5, filed on Feb. 27, 1996, No. 96830106.9, filed on Mar. 11, 1996 and No. 96830367.7, filed on Jun. 28, 1996, all assigned to the present assignee, describe a recompression method according to an ADPCM scheme of chrominance and luminance data blocks, output by the discrete cosine inverse transform processing circuit pipeline of the MPEG-2 decompression block (for the I-pictures and, after motion compensation, for the P-pictures), by coding the corresponding data for example according to a four-pel compression of luminance blocks and to a three-pel compression of chrominance blocks.

The main drawback of ADPCM recompression is that at increasingly high compression ratios a certain loss of image quality starts to manifest itself. The present invention provides a more efficient and advantageous recompression method which reduces considerably the loss of image quality, compared to the ADPCM method, at relatively high compression ratios and that, therefore, represents a decisively better alternative technique than the recompression according a an ADPCM scheme.

The main aspect of the present invention is that of effecting a compression of the chrominance and luminance data blocks of a macroblock of digital data, such as, for instance an MPEG decompressed block, by a compression method based on a "tree-search vector quantization" (TSVQ). This compression method, as explained below, responds very well to the above stated requirements, and further adds a certain degree of flexibility of compressing that allows, in a very simple manner, the modification or configuration of the coding and decoding circuits for optimizing them for a different compression level. The compression based on a vector quantization technique (TSVQ) is strongly dependent upon the method used to select the quantizer, which, in turn, is utilized to quantize the differences between adjacent pels. According to an important aspect of this invention, an optimal criterion is established for selecting the quantizer.

Summary of the Method

Let I be a digital picture represented by a matrix of M rows and N columns of pixels, and let I(x,y) the pixel defined by the row y and the column x, defined as an integer number by a number B of bits (binary figures).

Let the I picture be decomposed in rectangular blocks having an R×C size of R rows and C columns). The maximum efficiency for the compression is obtained if R and C are chosen amongst the integer divisors of M and N, respectively.

Let us assume by "pixels vector" the group of pixels belonging to a block and grouped in N-dimensional vectors.

The maximum compression efficiency is obtained when N is a divisor of R×C. Each block will then be subdivided in Nv=(R×C)/N vectors, so that each pel of each block belong to one vector only. The vectors are used within each block according to a proper scanning nd Vk is the k-th vector according to the scanning, and Vk(i) its i-th component (that is, the i-th pixel of the vector).

The algorithm performs a compression of each block, that is, a reduction of the number of bits necessary for representing the block itself, by exploiting only the data extracted from the block itself, for simplifying both the access to the block in the stream of compressed data and also the decompression of the block itself.

The TVSQ compression mechanism is twofold:
the prediction method; and
the vector quantization method.

Summary of the Prediction Method

This method exploits the correlation existing among adjacent pixels of a picture for reducing the number of bits necessary for a binary description of the picture itself. In fact, it is possible to approximate the value of a pixel vector by appropriately combining only the values of the pixels adjacent to it, and forming a second pixel vector, thus making what is commonly referred to as a vector "prediction".

It is therefore possible to reduce the amount of binary figures necessary for a digital representation of a picture by defining the prediction mechanism and by appropriately coding, rather than each pixel, only a prediction error vector. The more precise is the vector prediction (and thus of each of its components), the lower is the entropy of the prediction error, that is, the lower is the number of bits necessary for coding the latter.

Considering for example a scanning arrangement of the R×C block, such that for each J×K vector, with the exception of the first one (which is not subject to any modification the values of its components), there exists another, preceding it, that may be used as the predictor of the vector itself.

Let $V(i \ldots i+J-1, j \ldots j+K-1), i=1, \ldots, [R-J+1]$ and $j=1, \ldots, [C-K+1]$, the vector defined by the pixels contained in the rectangular area determined by the following coordinates:

top left coordinates (i,j)
top right coordinates (i,j+K−1)
bottom left coordinates (i+J−1, j)
bottom right coordinates (i+J−1,j+K−1)

By referring to the scheme of FIG. 6, the arrangement is defined as follows:

$OV(1 \ldots J, 1 \ldots K)$    first scanning vector $OV'(i \ldots i+J-1, 1 \ldots K)$    $i = 1+J, 2+J \ldots, R-J+1$ $OV'(i \ldots i+J-1, j \ldots j+K-1)$    $i = 1+J, 2+J \ldots, R-J+1$ and $j = 1, 1+K, 2+K, \ldots, C-K+1$

Summary of the Vector Quantization Method

Let us define E=V−V' the prediction error. Each error vector is quantized, that is to say, represented by the vector most similar to it among H vectors stored in a table, in a way that each vector defines the centroid of the areas in which the most general statistic of the prediction error vectors of a picture has been partitioned and that such a partition minimizes the mean square error as compared to any other possible partition of the same statistic.

This quantization table originates from the "Generalized Lloyd Algorithm" well know in literature (re "Vector Quantization & Signal Compression", by Gersho & Gray, K. A. P. publishers).

The advantage of a TSVQ compression technique derives from the fact that the quantization process terminates after a number of comparisons equal to the logarithm in base 2 of H; whereas if the search process used a thorough approach, the number of comparisons would be H.

The TSVQ compression method may be applied to each block in which the picture is decomposed through the following operations:

1) Selection and use of a scanning path of the R×C block by N dimension vectors;
2) Coding the unmodified first vector V(1.J, 1.K) of the R×C block;
3) Generating a vector and calculating the prediction error;
4) Quantizing by a binary search of the error and coding of the quantizer; and
5) Repeating steps 3) and 4), using the path defined in 2) for all the vectors of the R×C block.

Let the R×C block be composed as follows:

$A(1,1) \; A(1,2) \; A(1,3) \; A(1,4) \; A(1,5) \; A(1,6) \; A(1,7) \ldots A(1,C/K)$ $A(2,1) \; A(2,2) \; A(2,3) \; A(2,4) \; A(2,5) \; A(2,6) \; A(2,7) \ldots A(2,C/K)$ $A(3,1) \; A(3,2) \; A(3,3) \; A(3,4) \; A(3,5) \; A(3,6) \; A(3,7) \ldots A(3,C/K)$ $A(R/J,1) \quad A(R/J,2) \quad\quad A(R/J,4) \; A(R/J,4)$ $A(R/J,5) \quad A(R/J,6) \quad\quad A(R/J,7) \ldots A(R/J,C/K)$ where A is the vector composed of J×K pixels. The first vector A(1,1) is coded without any modification, according to its original resolution by B bits. The selected scanning for generating the prediction error and the relative vector quantization is:

first row, A(1,1), A(1,2) . . . A(1,C/K)
second row, A(1,1),A(2,1),A(2,2) . . . A(2,C/K)
third row, A(1,1),A(2,1),A(3,1), A(3,2) . . . A(3,C/K)
last row, A(1,1),A(2,1),A(3,1),A(4,1), . . . ,A(R/J,1),A(R/J, 2). . . A(R/J,C/K)

3) Generating a predictor vector for the current one to be quantized. The prediction is of the spatial type, thus intending the generation of the components of the prediction error vector as sum and/or difference, weighed by appropriate coefficients, of pixels relative to adjacent vectors. Some example are reported below.

As for as the prediction in the first row is concerned, use is made of the prediction vector that precedes the predicted one. For example, to predict A(1,2) the predictor used is A(1,1).

For instance, let A(1,1) and A(1,2) be two vectors with j=k=2:

$A(1,1) = P0 \; P1 \quad\quad A(1,2) = Q0 \; Q1$ $\phantom{A(1,1) =\,} P2 \; P3 \quad\quad \phantom{A(1,2) =\,} Q2 \; Q3$ The prediction vector is equal to:

$E() = Q0 - P1 \quad\quad Q1 - P1$ $\phantom{E() =\,} Q2 - P3 \quad\quad Q3 - P3$ With regard to the prediction relative to the first column and characterized by a chaining together of the vectors A(1,1), A(2,1), A(3,1), A(4,1) . . . , A(R/J,1), once again use is made of the vector of the preceding vertical position as predictor vector. For example, let A(1,1), and A(2,1) two vectors with J=k=2:

$A(1,1) = P0 \; P1 \quad\quad A(2,1) = Q0 \; Q1$ $\phantom{A(1,1) =\,} P2 \; P3 \quad\quad \phantom{A(2,1) =\,} Q2 \; Q3$ The prediction error is equal to $E() = Q0 - P2 \quad\quad Q1 - P3$ $\phantom{E() =\,} Q2 - P2 \quad\quad Q3 - P3$ With regard to the prediction of the remaining vectors that do not belong to the first top row neither to the first left column, according to the current scanning path, the prediction error is calculated as follows:

let A(2,2) the vector to be predicted using pixels belonging to A(1,1), A(1,2) and to A(2,1)

A(1, 1), A(1, 2)   (located as vectors)
(2, 1), A(2, 2)

This is equivalent to the following position in pixels:

P0A(1, 1)  P1A(1, 1)  F0A(1, 2)  F1A(1, 2)
P2A(1, 1)  P3A(1, 1)  F2A(1, 2)  F3A(1, 2)
G0A(2, 1)  G1A(2, 1)  Q0A(2, 2)  Q1A(2, 2)
G2A(2, 1)  G3A(2, 1)  Q2A(2, 2)  Q3A(2, 2)

For example, the predictor error vector will be calculated as follows:

$$F()A(2, 2) => \begin{matrix} E0 & E1 \\ E2 & E3 \end{matrix}$$

$E0 =$
$Q0A(2, 2) - [a*F2A(1, 2) + b*P3A(1, 1) + c*G1A(2, 1)]/(a + b + c)$ $E1 =$
$Q1A(2, 2) - [d*F3A(1, 2) + e*P3A(1, 1) + f*G1A(2, 1)]/(d + e + f)$ $E2 =$
$Q2A(2, 2) - [g*F2A(1, 2) + h*P3A(1, 1) + i*G3A(2, 1)]/(g + h + i)$ $E3 =$
$Q3A(2, 2) - [l*F3A(1, 2) + m*P3A(1, 1) + n*G3A(2, 1)]/(l + m + n)$

4) Quantization through binary research and coding of the quantizer.

Let us consider the use of a quantization table constituted of H vectors, each of which is made of 4 integer components. Let us suppose their arrangement at the nodes of a binary tree and let H be equal to 15, then:

```
                H8
          H4
                H9
     H2
                H10
          H5
                H11
H1
                H12
          H6
                H13
     H3
                H14
          H7
                H15
```

Notation:
H2 e H3 are sons of H1
H4 e H5 are sons of H2
H7 e H6 are sons of H3
H8 e H9 are sons of H4
H10 e H11 are sons of H5
H12 e H13 are sons of H6
H14 e H15 are sons of H7

Note: a "vector son" is the vector whose components correspond to the arithmetic mean of the homologous components of the parents vectors. Let us suppose that we want to quantize one of the error predictors, E( ), generated in 3), with one of the following vectors H8, H9, H10, H11, H12, H13, H14 o H15.

To do so let us calculate the distance (for example the Norm I2=the sum of the squares of the differences among the components of the two vectors) between the vector E( ) and H2 and between the vector E( ) and H3. For instance, let the latter be less that the first, thence, the calculation of the distance must be repeated between E( ) and H6 and between E( ) and H7.

In fact, in the binary tree, H6 and H7 are sons of H3. Let us suppose that the first is less than the second, then the distance between E( ) and H12 and between E( ) and H 13 will be calculated: if the latter is less than the first then H13 will be the quantized vector of E( ).

Only the vectors H8, H9, H10, H11, H12, H13, H14 and H15 can be the quantized ones of E( ), while the others are used for determining which of those is more similar to E( ).

Finally, as an alternative to the Norm I2, any other distance measurement may be utilized within the vectors space (for example the Norm I1, that is to say the sum of the modules of the differences among the homologous components of the two vectors).

For each vector V of dimensions J×K pixels of the R×C block, the predictor to be adopted will be V' of as many pixels as previously defined. It should be noticed that such a predictor, following the previously detailed scanning arrangement, has already been quantized and reconstructed, and therefore it is not taken from the original picture. This allows for a better control of image quality than with known DPCM techniques.

Summary of an Example of Compression With N Bits Per Pixel

Figure 7:
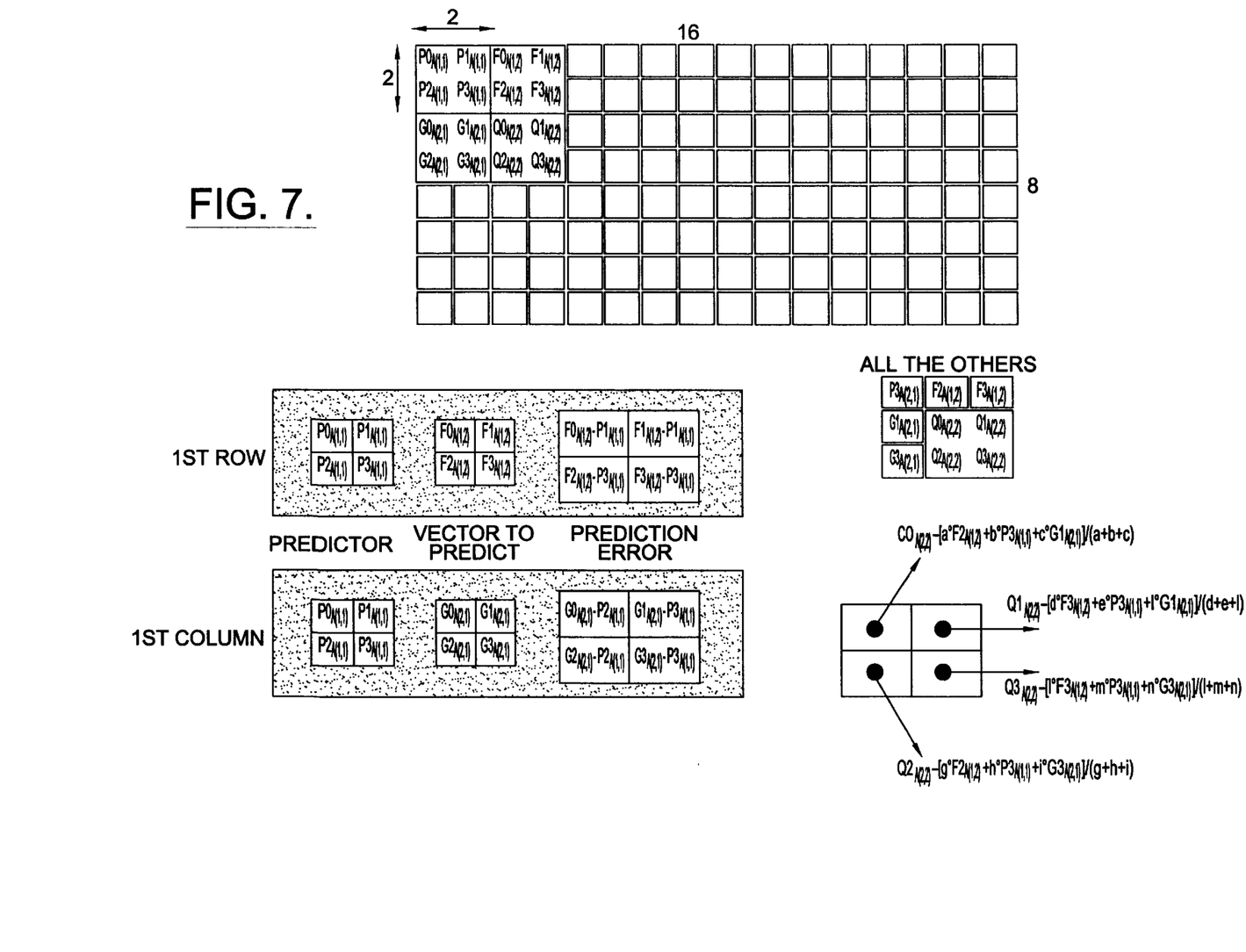
FIG. 7 illustrates a sample calculation of the prediction error for the luminance component, for the case R=8 and C=16 and for the case J=2 and K=2.

With reference to the above, let us consider a 16*8 block of pixels after eventual motion compensation. Let us suppose to independently compress each vector of pixels relative to an area of 2×2 of the picture and comprised within the 16*8 block for luma (as shown in FIG. 7) and 8*4 block for chroma.

The total number of bits utilized for the compression of the block is:

8*J*K+(C−1)*N where:

8=bits used for the coding of each component of the first scanning vector

J=Vertical dimension of the pixels vector

K=horizontal dimension of the pixels vector

N=bits used for coding each vector

C=number of pixel vectors within the R×C block

For the case J=2, C=32, N=7, K=2 and for the luminance we obtain a total of:

8*2*2+(32−1)*7=249 bit/macroblock 16*8

For the case J=2, K=2, C=8, N=5 and for the chrominance we obtain a total of:

8*2*2+(8−1)*5=67 nit/macroblock 8*4.

Summary of an Example of Compression of an MPEG Macroblock

Each macroblock is made up of two 16*8 blocks of luminance and of two 8*8 blocks of chrominance; each macroblock is coded with a number of bits equal to:

$$\underset{luma}{(2*16*8*8)} + \underset{chroma}{(2*8*8*8)} = 3.072 \text{ bit}$$

In each frame PAL there are 1620 macroblocks:

3,072×1620=4,976,640 bits

It is known that the chrominance has a lower data content, presenting a band restricted to the lowest spatial frequencies. This implies a greater predictability of chrominance, that is, a greater efficiency of the TSVQ compression. By considering a 7 bit/vector compression for the luminance and a 5 bit/vector for the chrominance the memory requirement becomes $$\underset{luma}{(2*249)} + \underset{chroma}{(67*4)} = 766 \text{ bits}$$

Therefore, each frame occupies:

766×1620=1,240,920 bits

The macroblock compression factor so obtained is equal to 4.

Summary of an Example of Application to an MPEG Decoder

By taking into account the above relationships it is possible to reach the target of 5 Mbytes by assuming the compression with the above computed factor for the I and P decompressed pictures. This result is attained by recompressing the I and P pictures after the MPEG decompression and before they are stored in the video memory. They will be then decompressed when they are read from the external memory, as shown in FIG. 1.

The compression is applicable to the 16*8 block output from the I-DCT and motion compensation pipeline. In particular, in the considered example, for the 16*8 blocks of luminance, subdivided in 2*2 vectors, a 7 bits/vector compression is selected, whereas for the 8*4 blocks of chromimance, subdivided in 2*2 vectors, a 5 bits/vector compression is selected. Thus the memory requirement becomes:

1,835,008+810,000+1,240,920+1,240,920=5,126,848 bits

DETAILED DESCRIPTION OF THE PREFERRED EMBODIMENTS

Figure 2:
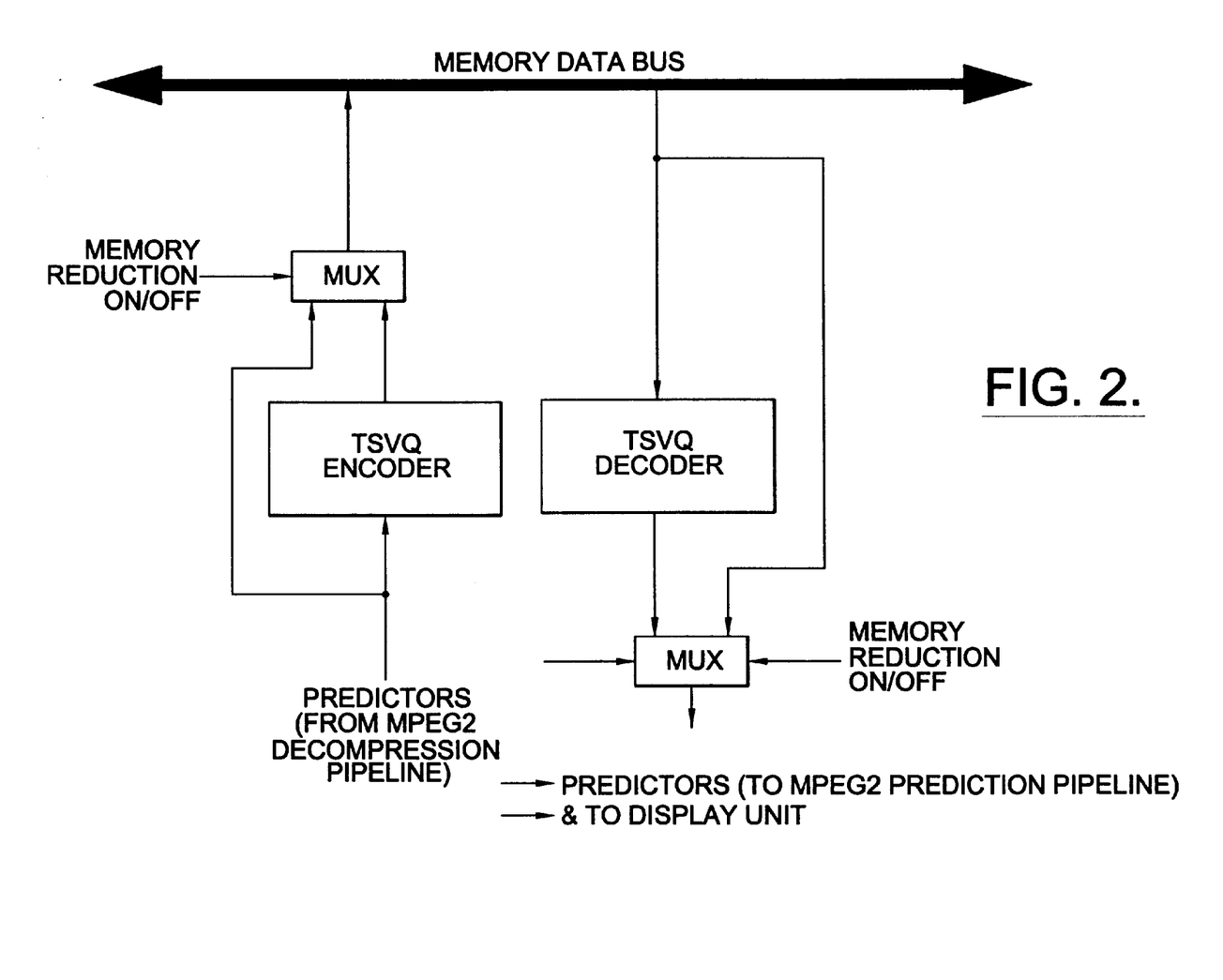
FIG. 2 shows the encoder, the decoder and the multiplexer needed for enabling or disabling TSVQ recompression.

With reference to FIG. 2, the TSVQ encoder feeds the compressed data stream to a multiplexer to a second input of which there exists the same input signal of the TSVQ encoder. By a configurable control signal, conveyed through the data bus by a microprocessor connected to the decoder, as shown in FIG. 1, it is possible to condition the multiplexer for selecting one or the other of the two inputs, to use or exclude the TSVQ compression.

The same applies to the decoder. The exclusion of the TSVQ encoding also implies that of the TSVQ decoding. In practice, a dynamic management of the external memory may be implemented to make available memory space by activating the TSVQ encoder and the TSVQ decoder. This might be convenient in the case of an external memory of 16 Mbytes to about 11 Mbytes being free to be used for other operations, such as, for example, for graphic functions or teletext.

Figure 3:
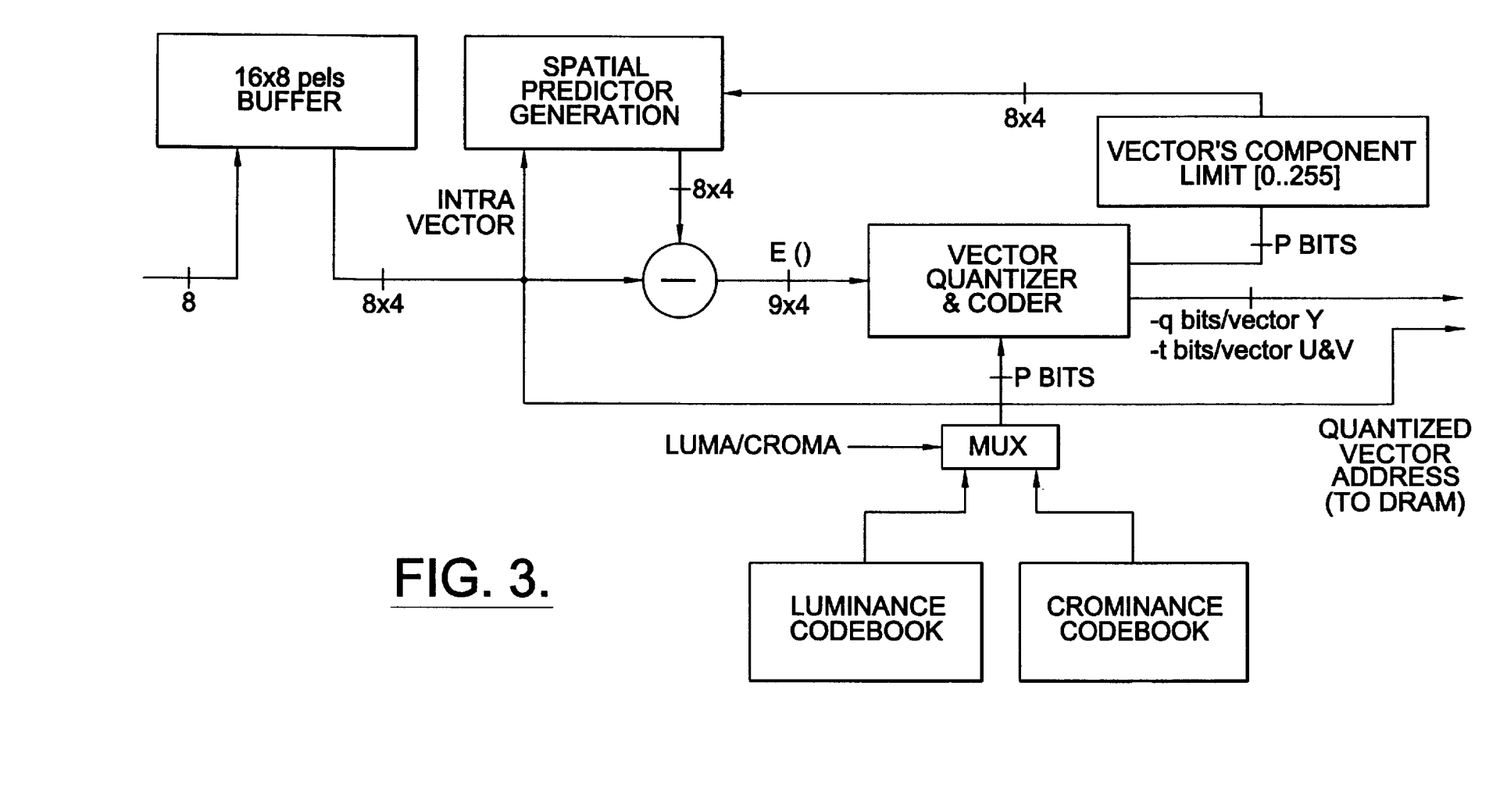
FIG. 3 is a block diagram of the TSVQ encoder that highlights the two quantizing tables for luma and chroma, respectively.

FIG. 3 shows a circuit which, apart from providing a general view of the encoder, also details the prediction and quantization loop of the single pixel vectors. It should be noticed the way the two tables of quantizers, optimized for luma and choma compression have been defined. A multiplexer selects which of the two tables should be used depending on whether the chroma or the luma is being compressed.

The input buffer, for example, with a memory capacity of 16×8 pixels (coded by 8 bits each) serves to store the block to the decomposed in vectors, for example, of 2×2. Each vector is then sent to a differential stage which determines the difference between the source and prediction vector. The resulting prediction error vector is then quantized by the block of FIG. 4. The ROM address, see FIG. 4, that contains the quantized vector is then sent to the DRAM memory, whereas the quantized vector read from such an address is sent to a unit that limits the modulus of its components between 0 and 255. Therefore, the relative output supplies the block that generates the predictor for the next vector to be quantized. This block implements the function described in paragraph 3) above. Finally, the starting vector of the scanning is sent unmodified to the DRAM and thus in recorded with full precision.

Figure 4:
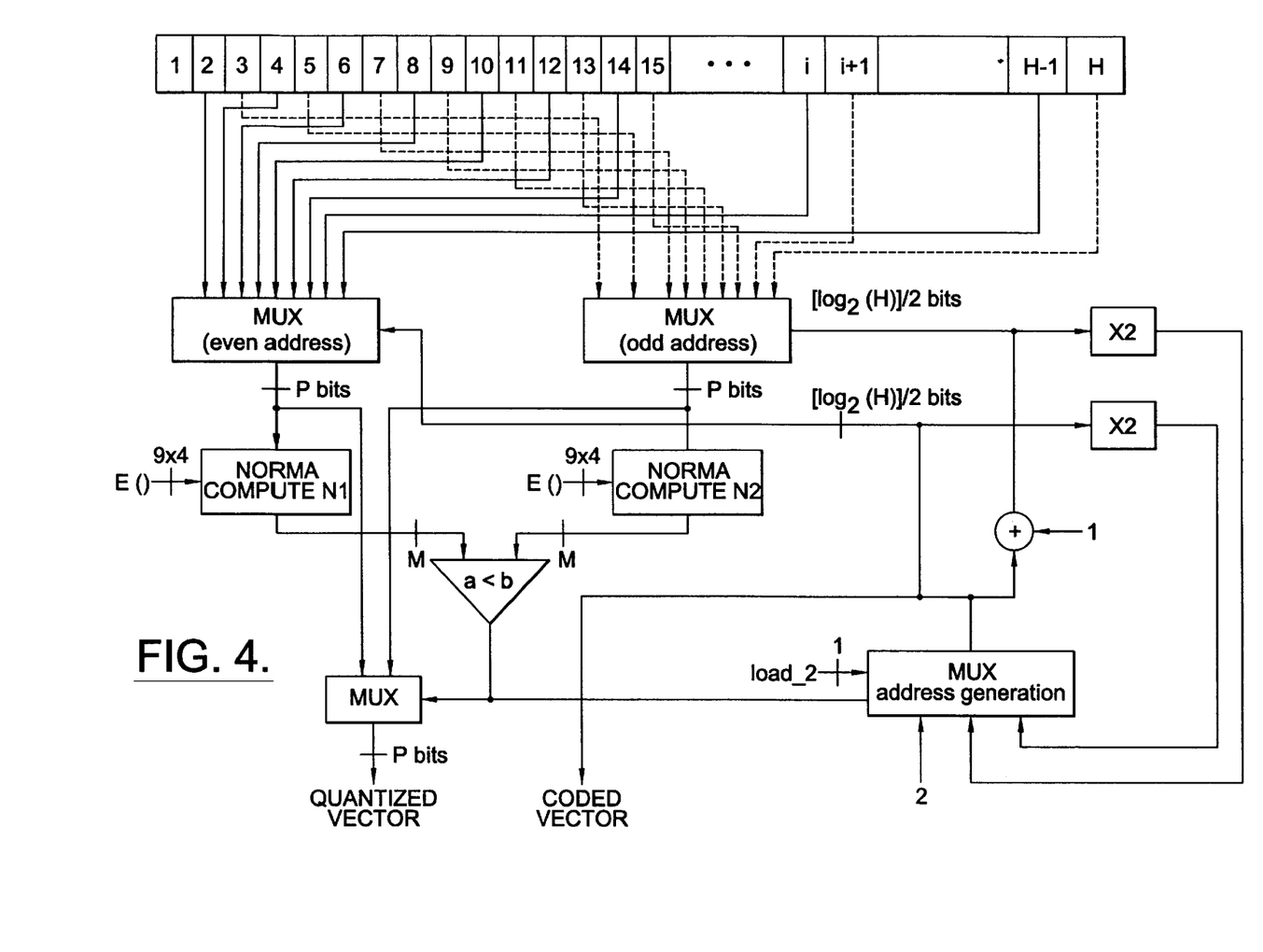
FIG. 4 shows the architecture of the vector quantizer which permits to quantize the prediction error vector.

FIG. 4 illustrates an example of the quantizing circuit of FIG. 3. The top of this figure shows the ROM where there is a vector stored at each address. The implemented quantizing algorithm will output the quantized vector and the address of the cell that contains it after a number of comparisons equal to the logarithm in base 2 of H.

All the ROM cells corresponding to the even addresses are linked to the MUX (even address) whereas those corresponding to the odd addresses are linked to the MUX (odd address). The outputs of the two MUXs respectively feed the NORM COMPUTE blocks that calculate the sum of the squares of the differences among the components of the two vectors present at the respective inputs. Alternatively, they can calculate the sum of the absolute values of the differences among the components.

The outputs of the two blocks that calculate the norm feed a comparator that determines which of the two norms is greater. The resulting signal drives the MUX (address generation) to generate the corresponding ROM address. If, the norm between the prediction error vector (see FIG. 3) and the vector read from the ROM at the odd address, is lower than the norm between the prediction error vector and the vector read from the ROM at the odd address, then, for the next iteration of the algorithm the address that drives the MUX (even addresses) multiplied by 2, will be used. Otherwise, the address that drives the MUX (odd addresses), multiplied by 2, will be used.

These addresses are located at the input of the address generation MUX, plus the initial address 2 which is used for the first iteration. The MUX is driven by the output of the comparator and by the initialization signal which allows the use of the value 2 as the initial value of the ROM address for each search cycle. The MUX output is used to drive the MUX (even address), whereas the other MUX (odd address) is driven by the same output, incremented by 1, thus accessing the odd addresses of the ROM.

For instance, if H=15 then after four iterations, the architecture of the invention will provide both the quantized and the coded vectors. By referring to the example already described in paragraph 4):

1^ STEP
MUX address generation output=2
MUX even address control=2
MUX odd address control=3
NORM COMPUTE N1 input=H2
NORM COMPUTE N2 input=H3
Let N2<N1
coded vector=don't care
quantized vector=don't care
1^ STEP
MUX address generation output=6
MUX even address control=6
MUX odd address control=7
NORM COMPUTE N1 input=H6
NORM COMPUTE N2 input=H7
Let N1<N2
coded vector =don't care
quantized vector =don't care
3^ STEP
MUX address generation output=12
MUX even address control=12
MUX odd address control=13
NORM COMPUTE N1 input=H12
NORM COMPUTE N2 input=H13
Let N2<N1
coded vector=don't care
quantized vector=don't care
4^ STEP
MUX address generation output=13
MUX even address control=don't care
MUX odd address control=don't care
NORM COMPUTE N1 input=don't care
NORM COMPUTE N2 input=don't care
coded vector=13
quantized vector=H13

Figure 5:
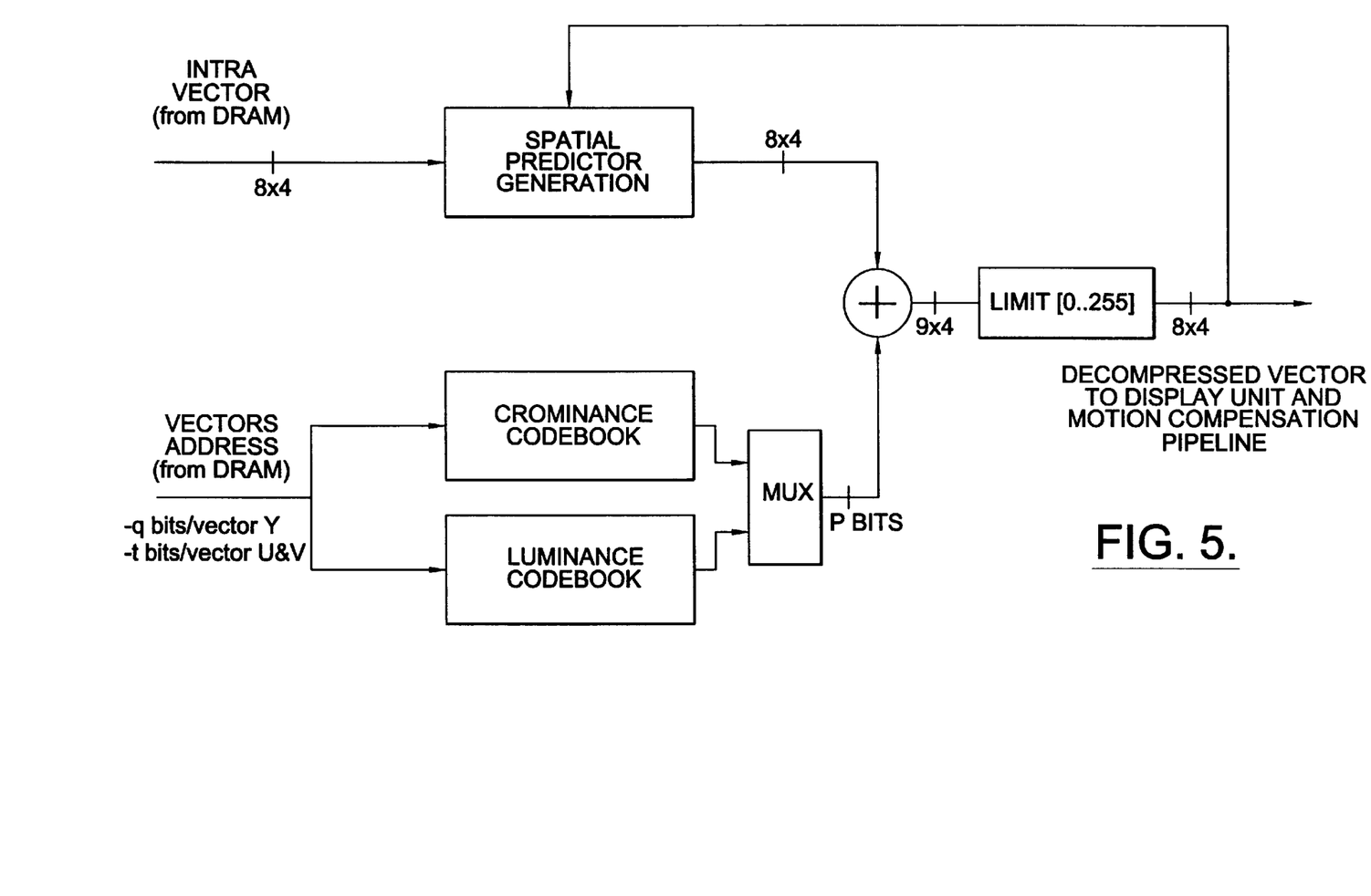
FIG. 5 shows the architecture of the TSVQ decoder depicted in FIG. 2.

Besides showing a generalized view of the decoder, FIG. 5 also details the prediction loop for decoding the pixel vector that follows the current one. It should be noticed the way of defining the two quantizing tables, as optimized for luma and chroma compression. A multiplexer selects which of the two must be used, depending on whether the luma or the chroma are being decompressed.

The coded vector read from the DRAM is used as ROM address containing the codebook. The read vector is then sent to an adder stage which operates the sum with the vector generated by the SPATIAL predictor generation block. This sum is sent to a unit that limits the modulus of its components between 0 and 255. This unit's output feeds the block for the generation the predictor for the next vector to be dequantized. (Such a block implements the function previously described in paragraph 3). Finally the same INTRA vector, the starting vector of the scanning, is read from the DRAM memory to initialize the decoding.

Figure 6:
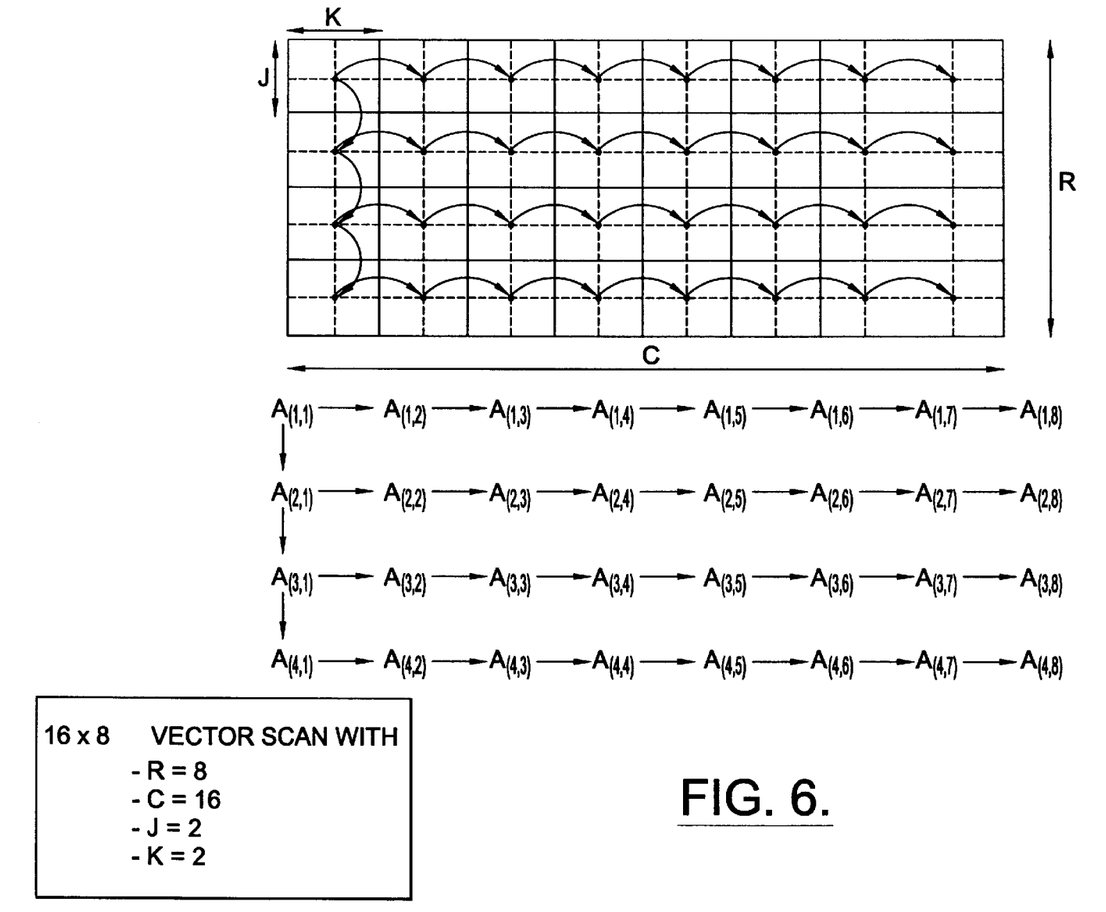
FIG. 6 illustrates the scanning path of a R×C block by means of J×K vectors.

FIG. 6 illustrates the scanning path of a block with R×C dimensions through the J×K vectors, in which R=8, C=16, J=2, K=2. FIG. 7 illustrates a sample of calculation of the prediction error for the luminance component, for the case of R=8, C=16, J=2 and K=2.

As will be evident to a person skilled in the art, besides in MPEG coding/decoding systems, the invention is equally useful to reduce the memory requirement even for different processing systems of video data streams such as for example in SQTV (or IQTV) processors. Moreover, it may also be exploited in coding/decoding systems of data blocks relative to nonvideo information that may be conveniently coded in vectors and compressed through a technique of vector quantization by means of an architecture as that shown in FIG. 4 with a TSVQ algorithm to reduce the memory requirement of the buffers in which the information must be to temporarily stored because of processing needs.

In particular, the TSVQ compression method can be successfully used, according to the invention, in a video processor SQTV (or IQTV) of the type described in the European patent application No. 96830134.1, filed on Mar. 20, 1996 assigned to the present assignee, whose content is herein incorporated by reference in its entirety, as an alternative to the ADPCM compression method therein described.

Figure 8:
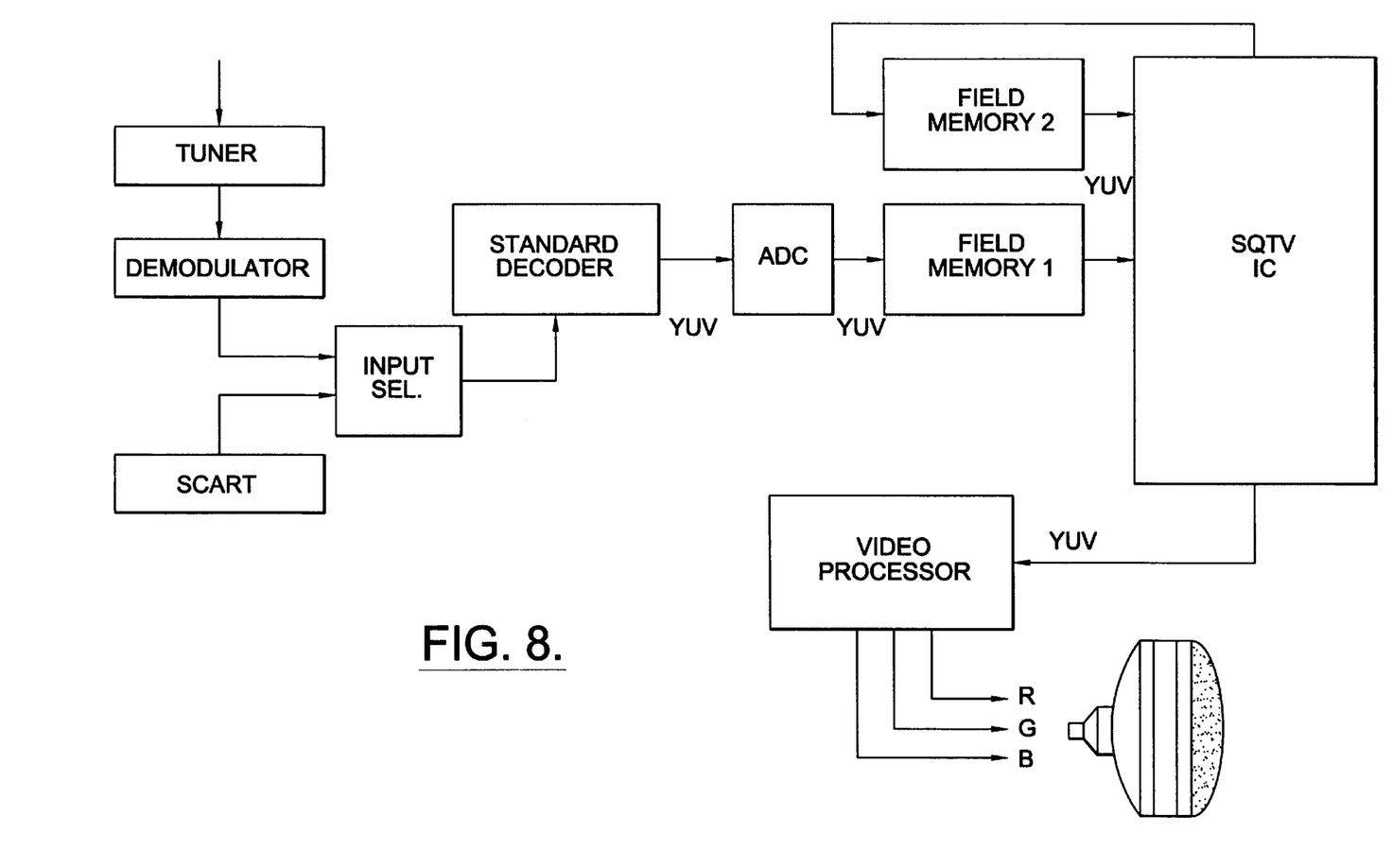
FIG. 8 is a block diagram of a video receiver comprising a processing system SQTV of the digitized video signals.

FIG. 8 shows the block diagram of a video receiver comprising a processing system of the digitized video signals of the prior patent application, provided by a SQTV IC device using two external buffers FIELD MEMORY 1 and FIELD MEMORY 2 for storing the digital data and permit undertaking of signal processing by the SQTV processor in a real time manner while being sent to a video display unit.

In the perspective of realizing SQTV IC devices that include storage buffers integrated on the same device, the reduction of the memory requirement of the buffers that may be obtained according to the invention may become a decisive feature in determining feasibility at an acceptable cost.

That which is claimed is:

1. A method for reducing a RAM requirement for temporarily storing a stream of data blocks in a coding/decoding system for information transferable by blocks, the method comprising the steps of:

compressing and coding the data by blocks through a tree search vector quantization (TSVQ);

storing TSVQ compressed and coded data in the RAM;

decoding and decompressing in a subsequent reading of the data stored in the RAM the coded and compressed data to reconstitute the stream of data blocks;

fixing a certain scanning path of each data block of the stream of data to be decomposed into vectors of pre-established dimensions;

coding a first vector of the scanning of a certain block of data in an unmodified manner;

generating a replica vector of a last coded vector and calculating a prediction error vector;

quantizing according to a binary search in a table of read-only quantized vectors the prediction error by coding its address in the table; and repeating the generating and quantizing steps following the scanning path for all the vectors of the scanning of each data block.

2. A method according to claim 1, wherein the data block is a block of n*m pixels of a picture.

3. A method for reducing a memory requirement for temporarily storing a stream of data blocks each comprising n*m pixels of a picture in a coding/decoding system for information transferable by blocks, the method comprising the steps of:

compressing and coding the data by blocks through a tree search vector quantization (TSVQ);

storing TSVQ compressed and coded data in the memory;

decoding and decompressing in a subsequent reading of the data stored in the memory the coded and compressed data to reconstitute the stream of data blocks;

fixing a certain scanning path of each data block of the stream of data to be decomposed into vectors of pre-established dimensions;

coding a first vector of the scanning of a certain block of data in an unmodified manner;

generating a replica vector of a last coded vector and calculating a prediction error vector;

quantizing according to a binary search in a table of read-only quantized vectors the prediction error by coding its address in the table; and repeating steps the generating and quantizing steps following the scanning path for all the vectors of the scanning of each data block.

4. A circuit for reducing a memory requirement for temporarily storing a stream of data blocks in a coding/decoding system for information transferable by blocks, the circuit comprising:

means for compressing and coding the data by blocks through a tree search vector quantization (TSVQ);

means for storing TSVQ compressed and coded data in the memory;

means for decoding and decompressing in a subsequent reading of the data stored in the RAM the coded and compressed data to reconstitute the stream of data blocks;

means for fixing a certain scanning path of each data block of the stream of data to be decomposed into vectors of preestablished dimensions;

means for coding a first vector of the scanning of a certain block of data in an unmodified manner;

means for generating a replica vector of a last coded vector and calculating a prediction error vector;

means for quantizing according to a binary search in a table of read-only quantized vectors the prediction error by coding its address in the table; and means for repeating the generating and quantizing following the scanning path for all the vectors of the scanning of each data block.

* * * * *

UNITED STATES PATENT AND TRADEMARK OFFICE
CERTIFICATE OF CORRECTION

PATENT NO. : 6,108,381
DATED : August 22, 2000
INVENTOR(S) : Danilo Pau, Roberta Bruni, Roberto Sannino It is certified that error appears in the above-identified patent and that said Letters Patent is hereby corrected as shown below:

| | |
|---|---|
| FIG. 7 | As marked, delete: "I" |
| | As marked, insert -- f -- |
| Column 1, Line 27 | Delete: "HDVT" |
| | Insert -- HDTV -- |
| Column 2, Line 37 | Delete: "being" |
| Column 4, Line 43 | Delete: ")" |
| Column 5, Line 49 | Delete: "know" |
| | Insert -- known -- |
| Column 5, Line 62 | Delete: "V(1.J, 1.K)" |
| | Insert -- V(1...J, 1...K) -- |
| Column 12, Line 25 | Delete: "NI" |
| | Insert -- N1 -- |
| Column 6, Line 27 | Delete: "example" |
| | Insert -- examples -- |
| Column 12, Line 30 | Delete: "1^step" |
| | Insert -- 2^step -- |

Signed and Sealed this

Twenty-ninth Day of May, 2001

Attest:

NICHOLAS P. GODICI

*Attesting Officer*      *Acting Director of the United States Patent and Trademark Office*